United States Patent [19]

Miyazaki

[11] Patent Number: 5,548,421
[45] Date of Patent: Aug. 20, 1996

[54] PLASMA ADDRESSING ELECTRO-OPTICAL DEVICE HAVING ELECTRODES ON A PLANAR SURFACE

[75] Inventor: Shigeki Miyazaki, Kanagawa, Japan

[73] Assignee: Sony Corporation, Tokyo, Japan

[21] Appl. No.: 423,139

[22] Filed: Apr. 18, 1995

Related U.S. Application Data

[63] Continuation of Ser. No. 48,507, Apr. 20, 1993, abandoned.

[30] Foreign Application Priority Data

Apr. 21, 1992 [JP] Japan .................................. 4-128262

[51] Int. Cl.$^6$ .......................... G02F 1/133; G02F 1/1333
[52] U.S. Cl. ............................................. 359/54; 359/87
[58] Field of Search ........................ 359/54, 87; 340/794, 340/709

[56] References Cited

U.S. PATENT DOCUMENTS

| | | | |
|---|---|---|---|
| 4,896,149 | 1/1990 | Buzak et al. | 340/794 |
| 5,214,521 | 5/1993 | Kwon et al. | 359/54 |
| 5,221,979 | 6/1993 | Kim | 359/54 |
| 5,383,040 | 1/1995 | Kim | 359/54 |

OTHER PUBLICATIONS

"Surface–Discharge–Type Plasma Display Panel", IEEE Trans-actions on Electron Devices, vol. 23, No. 3, Mar. 1976, pp. 328–331.

"Coplanar Gas–Discharge Display", IEEE Transactions on Electron Devices, vol. ED–28 Sep. 1981, No. 9, pp. 1035–1042.

*Primary Examiner*—William L. Sikes
*Assistant Examiner*—Charles Miller
*Attorney, Agent, or Firm*—Hill, Steadman & Simpson

[57] ABSTRACT

A plasma addressing electro-optical device including a first substrate having a major surface: a plurality of first electrodes formed on the major surface of the first substrate so as to extend in substantially parallel relationship to each other; a second substrate having a major surface opposed to the major surface of the first substrate; a plurality of second electrodes formed on the major surface of the second substrate so as to extend in substantially parallel relationship to each other to generate plasma addressing between adjacent ones of the second electrodes; an electro-optical material layer formed between the first substrate and the second substrate; and a plasma discharge chamber formed between the electro-optical material layer and the second substrate so as to seal an ionizable gas therein. The plasma discharge chamber has a height of about 75% or more of a distance between the adjacent ones of the second electrodes. According to the setting of the height of the plasma discharge chamber in relation to the distance between the adjacent second electrodes, stable and uniform plasma discharge in the plasma discharge chamber can be realized.

8 Claims, 10 Drawing Sheets

PLASMA ADDRESSING ELECTRO-OPTICAL DEVICE HAVING ELECTRODES ON A PLANAR SURFACE

This is a continuation of application Ser. No. 08/048,507, filed Apr. 20, 1993, now abandoned.

BACKGROUND OF THE INVENTION

1. Field of the Invention

The present invention relates to a plasma addressing electro-optical device having a dual-layer structure constituted of an electro-optical cell such as a liquid crystal cell and a plasma cell, and more particularly to a structure of the plasma cell.

2. Description of the Related Art

In a matrix type electro-optical device such as a liquid crystal display device employing a liquid crystal cell as an electro-optical cell, an active matrix addressing system is generally known as a means for effecting a high resolution and a high contrast. In such an active matrix addressing system, a plurality of switching elements such as thin film transistors are individually provided for a plurality of picture elements, and the switching elements are driven in a line sequential manner. However, as a plurality of semiconductor elements such as thin film transistors must be provided on a substrate, there occurs a problem such that a yield is reduced particularly in the case of enlarging a picture area of the device.

Figure 13:
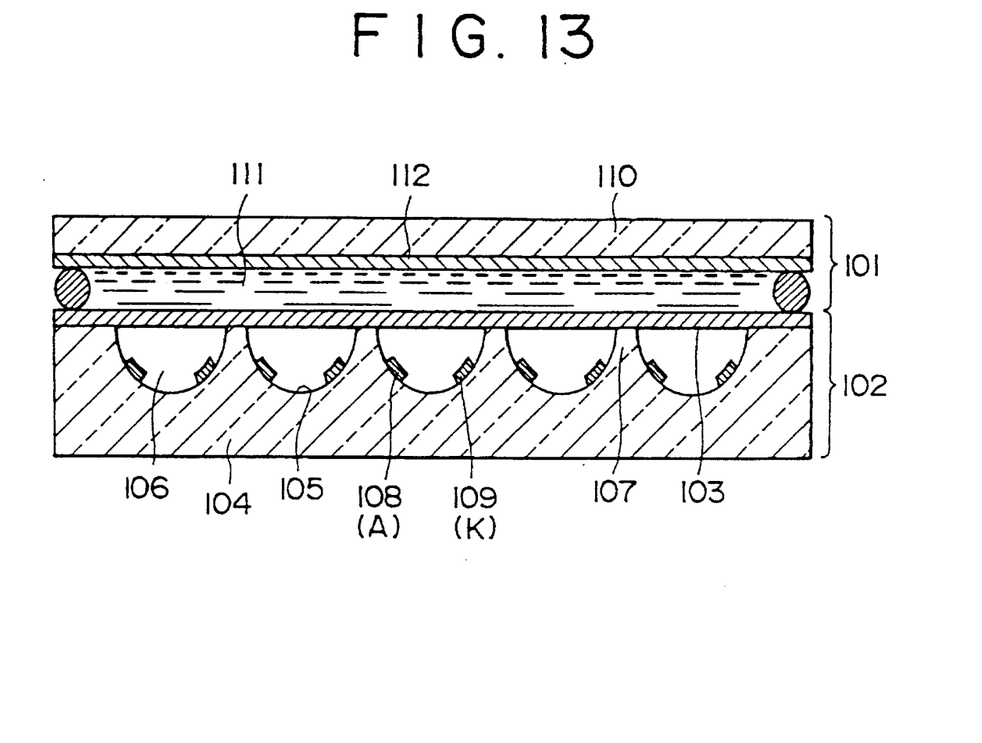
FIG. 13 is a vertical sectional view of a plasma addressing electro-optical device in the related art.

To solve this problem, there has been proposed in Japanese Patent Laid-open Publication No. 1-217396 (corresponding to U.S. Pat. Nos. 4,896,149 and 5,077,553) a system of utilizing plasma switches rather than the switching elements such as thin film transistors. There will now be described in brief a construction of a plasma addressing electro-optical device having a liquid crystal cell adapted to be driven by utilizing such switches based on plasma discharge. As shown in FIG. 13, the conventional plasma addressing electro-optical device has a laminated flat panel structure constituted of a liquid crystal cell 101, a plasma cell 102 and an intermediate plate 103 interposed between the liquid crystal cell 101 and the plasma cell 102. The plasma cell 102 is formed from a glass substrate 104. A plurality of parallel grooves 105 are formed on an upper surface of the glass substrate 104. The grooves 105 extend in a direction of rows of a matrix, for example. The grooves 105 are enclosed by the intermediate plate 103 to thereby define a plurality of individual plasma chambers 106. An ionizable gas is sealed in each of the plasma chambers 106. A crest portion 107 formed between adjacent ones of the grooves 105 serves as a barrier rib for separating the plasma chambers 106 from each other and as a gap spacer for the plasma chambers 106. A pair of plasma electrodes 108 and 109 extending in parallel to each other are provided on a bottom portion of each groove 105. The pair of plasma electrodes 108 and 109 function as an anode A and a cathode K for ionizing the gas in each plasma chamber 106 to generate a discharge plasma. Such a discharge region between the anode A and the cathode K serves as a line scanning unit. The bottom portion of each groove 105 is formed as a curved surface, and the pair of anode A and cathode K are disposed on the curved surface to incline with respect to each other at a predetermined angle in opposed relationship to each other. Accordingly, plasma discharge easily occurs between an electrode surface of the anode A and an electrode surface of the cathode K.

On the other hand, the liquid crystal cell 101 is constructed of a transparent substrate 110 and a liquid crystal layer 111 formed between the transparent substrate 110 and the intermediate plate 103. The transparent substrate 110 is opposed to the intermediate plate 103 with a predetermined space defined therebetween, and the liquid crystal layer 111 is filled in this space. A plurality of signal electrodes 112 are formed on an inside or lower surface of the transparent substrate 110 so as to extend in perpendicular relationship to the plasma chambers 106, thereby forming column driving units. The signal electrodes 112 are formed of a transparent conductive material. Accordingly, a plurality of picture elements are arranged in a matrix form at the intersections between the column driving units of the liquid crystal cell 101 and the line scanning units of the plasma cell 102.

In the electro-optical device having the above construction, the plasma chambers 106 of the plasma cell 102 are selectively scanned in a line sequential manner, and in synchronism therewith an analog driving voltage is applied to the signal electrodes 112 of the liquid crystal cell 101, thereby effecting display driving. When the plasma discharge occurs in the plasma chambers 106, an anode potential is reached almost over each plasma chamber 106 to select the picture elements at every line. That is, the plasma chambers 106 function as sampling switches. When a driving voltage is applied to each picture element under the condition where the plasma sampling switches are ON, sampling and holding are performed to control an on or off state of each picture element. Even after the plasma sampling switches become OFF, the analog driving voltage is held in each picture element as it is.

The above electro-optical device utilizing the discharge plasma may have an advantage such that a picture area of the device can be enlarged more easily than that in an electro-optical device using semiconductor elements. However, various problems remain in practical application. For example, the formation of the grooves 105 defining the plasma chambers 106 on the substrate 104 such as a glass substrate is considerably difficult in manufacturing. In particular, it is very difficult to form the grooves 105 with a high density. Further, while the plasma electrodes 108 and 109 for discharging are necessarily formed in each groove 105, an etching process for forming the plasma electrodes 108 and 109 is troublesome.

Figure 14:
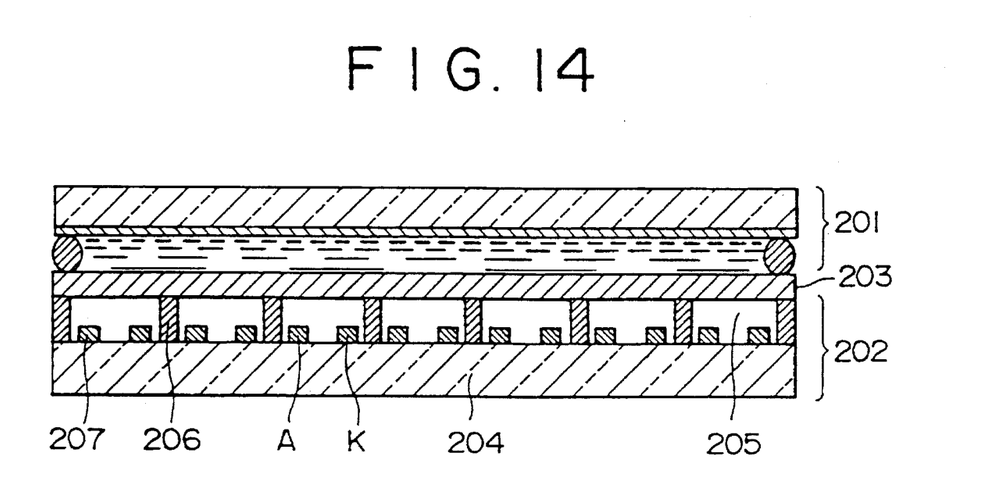
FIG. 14 is a vertical sectional view of a plasma addressing electro-optical device proposed by the present assignee as the related art.

In view of the above problems in the related art, the present assignee has already proposed in Japanese Patent Application No. 3-47784 a plasma addressing electro-optical device which can be simply manufactured and is suitable for a large picture area and a high resolution. There will now be described in brief a structure of such an improved device proposed by the present assignee, for the purpose of understanding of the present invention. Referring to FIG. 14, this improved device also has a laminated flat panel structure constituted of a liquid crystal cell 201 and a plasma cell 202. The liquid crystal cell 201 has basically the same structure as that of the liquid crystal cell 101 shown in FIG. 13. On the other hand, the plasma cell 202 is constituted of an intermediate plate 203 and a lower substrate 204 opposed to each other with a predetermined space defined therebetween. This space is partitioned by a plurality of barrier ribs 206 to define a plurality of plasma chambers 205. Each plasma chamber 205 forms a discharge region as a line scanning unit. An ionizable gas is sealed in each plasma chamber 205. The barrier ribs 206 are formed by a printing process. A pair of plasma electrodes 207 are formed in each separate discharge region to serve as an anode A and a cathode K. The plasma electrodes 207 are formed on an upper flat surface of the substrate 204 by a printing process. As the printing process is a very simple technique, the productivity and the workability can be improved as compared with those in forming the grooves in the related art. Further, the printing process is for enlargement of a picture area.

Various samples having the flat panel structure shown in FIG. 14 were actually prepared to carry out a plasma discharge test. As the test result, some of the samples showed a stable and uniform discharge between the anode and the cathode, but some of the samples showed almost no discharge however a sealed gas pressure and an applied voltage were set. This latter phenomenon was initially considered to be due to any defect in a production process, such as contamination in the plasma cell. However, there was almost no difference in this phenomenon even by changing the forming method for the electrodes or the kind of the electrodes. In subsequent investigation, it has been concluded that this discharge defect is caused by the arrangement itself of the electrodes. That is, the plasma electrodes shown in FIG. 14 are formed from a conductive thick film or the like, and the plasma cell is of a surface discharge type such that plasma discharge occurs between the upper surface of the anode and the upper surface of the cathode. However, since the anode and the cathode are formed on the flat surface of the substrate, the upper surfaces of the anode and the cathode are of the same level, and they are not opposed to each other. In contrast, the upper surfaces of the anode and the cathode shown in FIG. 13 are opposed to each other at a given inclined angle. In this manner, the electrode surfaces of the plasma cell shown in FIG. 14 are not opposed to each other in spite of the surface discharge type, thus possibly causing the above discharge defect.

In other words, the above test has taught that a structural limitation or condition is required to realize stable plasma discharge in the plasma cell structure shown in FIG. 14.

SUMMARY OF THE INVENTION

It is accordingly an object of the present invention to realize stable and uniform plasma discharge by defining design conditions of the plasma cell.

According to the present invention, there is provided a plasma addressing electro-optical device comprising a first substrate having a major surface; a plurality of first electrodes formed on the major surface of the first substrate so as to extend in substantially parallel relationship to each other; a second substrate having a major surface opposed to the major surface of the first substrate; a plurality of second electrodes formed on the major surface of the second substrate so as to extend in substantially parallel relationship to each other to generate plasma addressing between adjacent ones of the second electrodes; an electro-optical material layer formed between the first substrate and the second substrate; and a plasma discharge chamber formed between the electro-optical material layer and the second substrate so as to seal an ionizable gas therein, the plasma discharge chamber having a height of about 75% or more of a distance between said adjacent ones of said second electrodes.

An arcuate path of plasma discharge is formed between an upper surface of an anode and an upper surface of a cathode disposed on the same level in the plasma chamber. A negative charge such as electrons and a positive charge such as ions contained in the plasma are allowed to move along the arcuate path. The height of the plasma chamber, that is, the space of the plasma cell is defined to some degree to thereby ensure the discharge path, thus maintaining a stable and uniform plasma discharge. The condition for realizing the stable and uniform plasma discharge is to set the height of the plasma chamber to about 75% or more of the distance between the anode and the cathode adjacent to each other. If the height is smaller than this value, the discharge path will be blocked to result in a disadvantage that an effective discharge region cannot be formed.

As described above, according to the present invention, the height of the plasma chamber in the plasma addressing electro-optical device is set to about 75% or more of the distance between the anode and the cathode adjacent to each other, thereby obtaining a stable and uniform plasma discharge. Accordingly, the line-sequential operation of the plasma addressing electro-optical device with the discharge region functioning as a scanning unit can be reliably performed.

Other objects and features of the invention will be more fully understood from the following detailed description and appended claims when taken with the accompanying drawings.

DETAILED DESCRIPTION OF THE PREFERRED EMBODIMENTS

Figure 1:
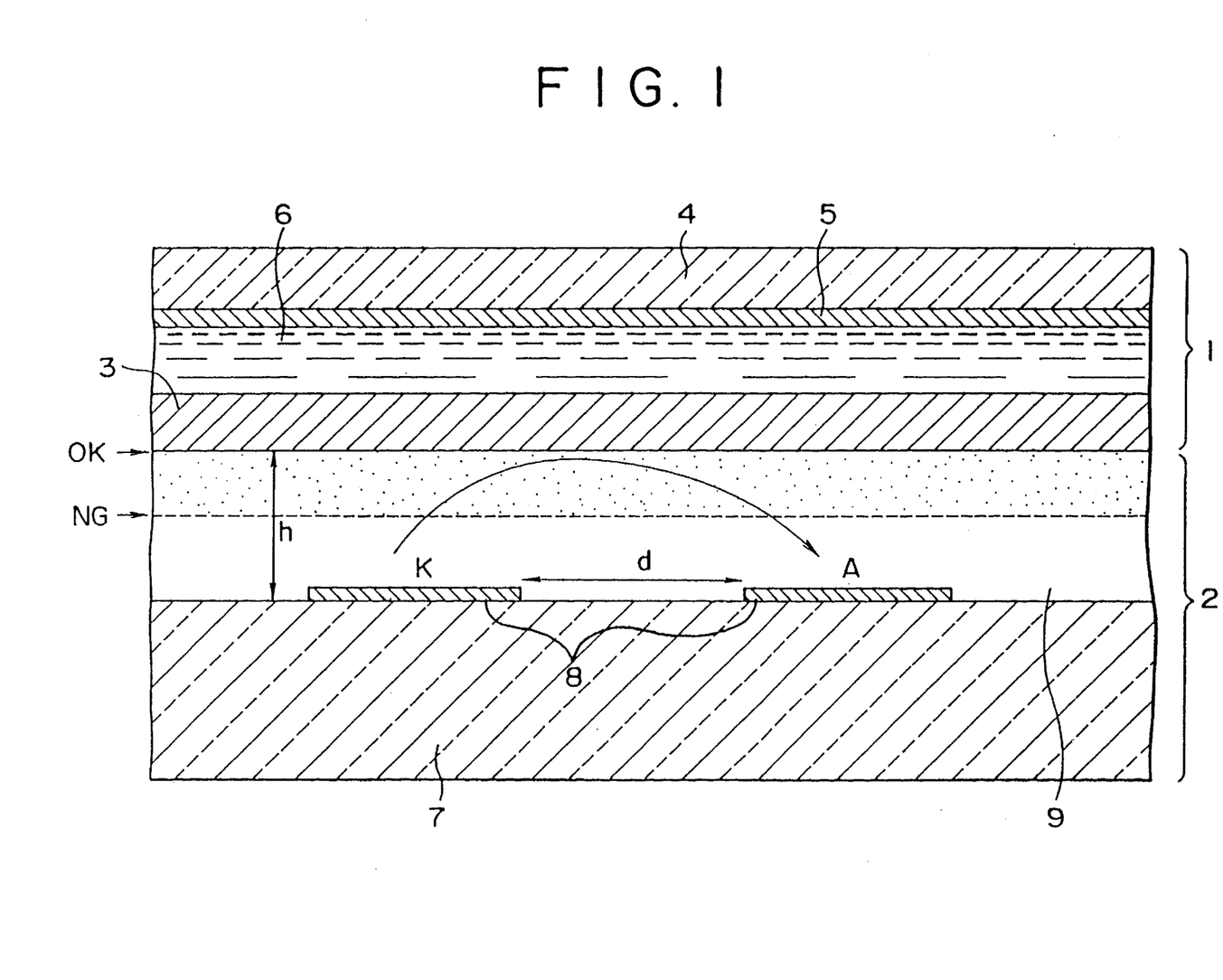
FIG. 1 is a vertical sectional view of a basic construction of a plasma addressing electro-optical device according to the present invention.

A preferred embodiment of the present invention will now be described with reference to the drawings. Referring to FIG. 1, there is shown a schematic fragmentary sectional view of a basic structure of a plasma addressing display device according to the preferred embodiment. The sectional view of FIG. 1 is taken along a column direction, that is, a longitudinal direction of signal electrodes 5 to be hereinafter described. The display device shown in FIG. 1 has a flat panel structure formed by laminating a liquid crystal cell 1, a plasma cell 2 and an intermediate plate 3 as a dielectric material layer interposed between the liquid crystal cell 1 and the plasma cell 2. The liquid crystal cell 1 is comprised of a glass substrate 4 opposed to the intermediate plate 3 with a predetermined space defined therebetween, a plurality of signal electrodes 5 formed on a lower or major surface of the glass substrate 4 so as to extend in parallel to each other in the column direction, and a liquid crystal layer 6 formed so as to fill the space defined between the glass substrate 4 and the intermediate plate 3. The signal electrodes 5 are formed from a transparent conductive film, and the liquid crystal layer 6 is formed of an electro-optical material. While the present invention is applied to the plasma addressing display device in this preferred embodiment, it is not limited to this preferred embodiment but may be widely applied to a plasma addressing electro-optical device such as an optical modulating device.

On the other hand, the plasma cell 2 is comprised of a glass substrate 7 opposed to the intermediate plate 3 with a sealed plasma chamber 9 defined therebetween, and a plurality of plasma electrodes 8 formed on an upper or major surface of the glass substrate 7 so as to extend in parallel to each other in a line direction perpendicular to the column direction, that is, perpendicular to the longitudinal direction of the signal electrodes 5. Adjacent ones of the plasma electrodes 8 function alternately as an anode A and a cathode K spaced apart predetermined distance d. The sealed plasma chamber 9 has a predetermined height h, and contains an ionizable gas selected from He, Ne, Ar, or a mixture thereof. The structure shown in FIG. 1 is a so-called open cell structure having no barrier ribs surrounding a pair of cathode K and anode A, unlike the structure shown in FIG. 14. Even in such an open cell structure, plasma generation between the anode A and the cathode K adjacent to each other can be localized to thereby form a discharge region as a line scanning unit. It is to be noted that the structure of the plasma cell in the present invention is not limited to such an open cell structure but it may be a structure having barrier ribs as shown in FIG. 14.

The space between the intermediate plate 3 and the glass substrate 7, that is, the height h of the plasma chamber 9 is set to be 75% or more of the distance d between the anode A and the cathode K adjacent to each other. A plasma discharge path between the anode A and the cathode K shows an arc or parabola. A peak of the parabola increases in proportion to the interelectrode distance d. Accordingly, the height h of the plasma chamber 9 must be set according to the interelectrode distance d so that the parabolic discharge path may not be cut off by a ceiling portion of the plasma cell 2, that is, by the intermediate plate 3. According to the present invention, the ratio of the height h to the distance d is set to about 75% or more. If the height h is set to less than 75% of the distance d as shown by a dotted line in FIG. 1, the plasma discharge is not effectively be generated.

In particular, the plasma electrodes 8 are configured in a stripe pattern having a stripe length of 132 mm, a stripe width of 0.15 mm, a stripe pitch of 0.39 mm, and a stripe number of 200. The plasma electrodes 8 are formed by printing or vapor deposition with use of a metal material such as Ni or Ag. The ionizable gas sealed in the plasma chamber 9 is Ne containing 0.5% of Ar. A discharge voltage is applied to the plasma cell 9 by DC scanning or DC static driving.

Figure 2:
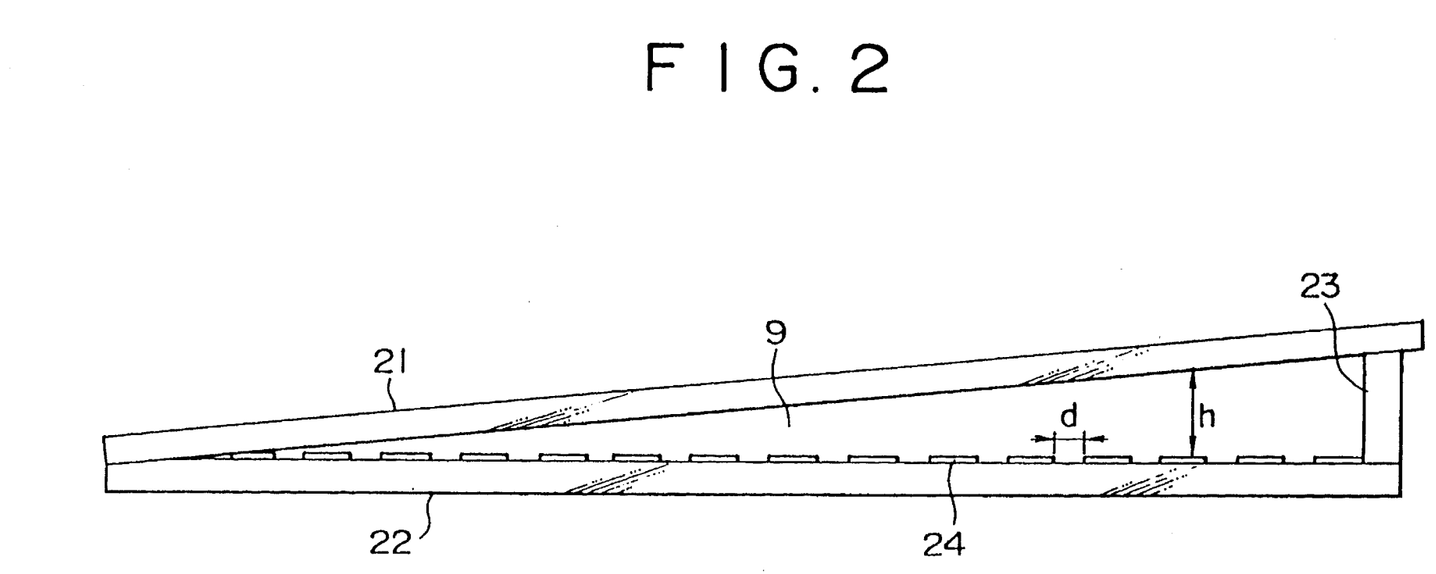
FIG. 2 is a vertical sectional view of a wedge-shaped plasma cell prepared to examine the relation between the height of the plasma chamber and the distance between the anode and the cathode.

In order to clarify the relation between the interelectrode distance d and the height h of the plasma chamber 9, a wedge-shaped cell as shown in FIG. 2 was prepared to carry out a discharge test. As shown in FIG. 2, the wedge-shaped cell is generally constructed of a pair of glass substrates 21 and 22 laminated to each other at one end thereof and a spacer 23 interposed therebetween at the other end, thereby defining a wedge-shaped plasma chamber 25 having a height h that is continuously changed. A plurality of plasma electrodes 24 having a stripe pattern are formed on an upper or inside surface of the lower glass substrate 22 so as to be spaced apart an interelectrode distance d. When a discharge voltage was applied to the plasma electrodes 24, adjacent ones of which functioning alternately as an anode and a cathode, a plasma was normally generated in a region where the height h is relatively large, but the plasma discharge was unstable in a region where the height h is relatively small. Especially, in a region where the height h is greatly small, local sparks merely occurred, and there did not occur continuous and uniform discharge even when a plasma gas pressure p and a discharge voltage V were changed.

Figure 3:
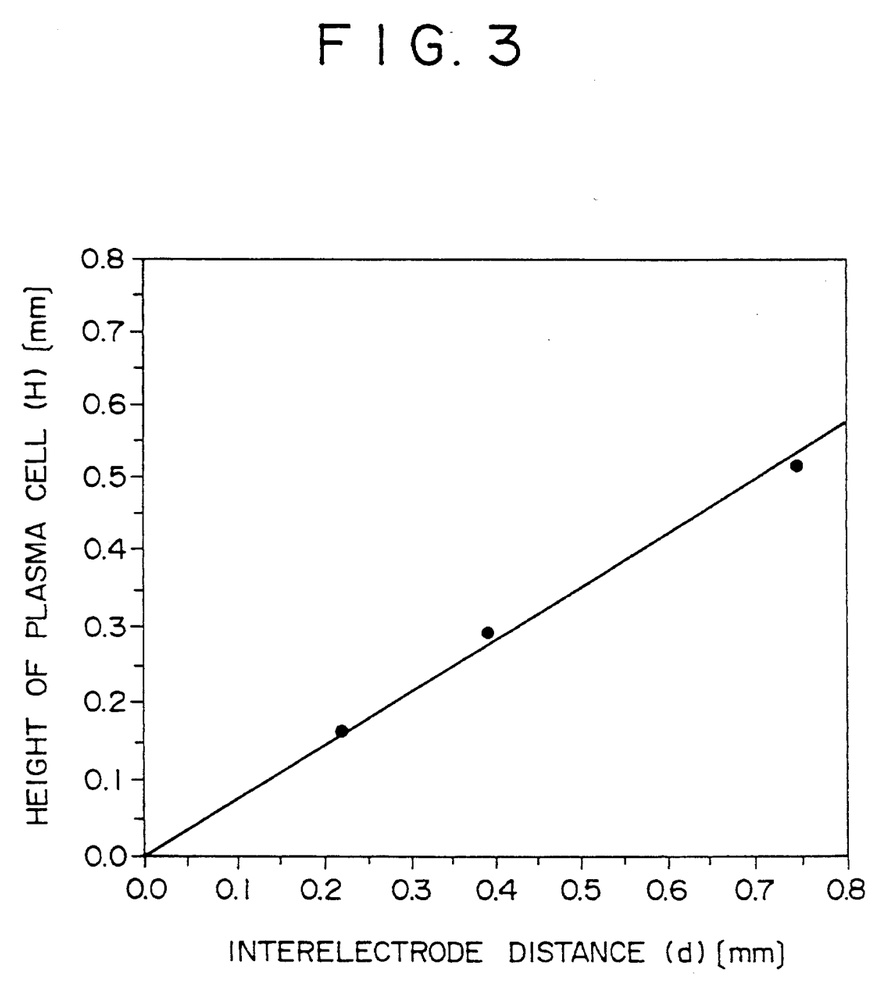
FIG. 3 is a graph showing the relation between an interelectrode distance d and a minimum height H of the plasma cell.

The height of a transitional region where the discharge starts to become unstable will be defined as a minimum height H required for stable discharge. The intermediate distance d (a minimum distance between one side of the anode and one side of the cathode opposed to the one side of the anode) was varied as a parameter to prepare three kinds of wedge-shaped cells. Then, the minimum height H was measured by using the three kinds of wedge-shaped cells. The result of measurement is shown in FIG. 3. The minimum height H was about 0.2 mm for a parameter d of 0.23 mm; the minimum height H was about 0.3 mm for a parameter d of 0.4 mm; and the minimum height H was about 0.52 mm for a parameter of 0.74 mm. As apparent from FIG. 3, the relation between the minimum height H and the interelectrode distance d is substantially proportional to each other to provide a slope of 0.75. Thus, it was clarified that the minimum height of the plasma chamber necessary for obtaining stable plasma discharge or glow discharge is about 75% of the interelectrode distance.

Figure 4:
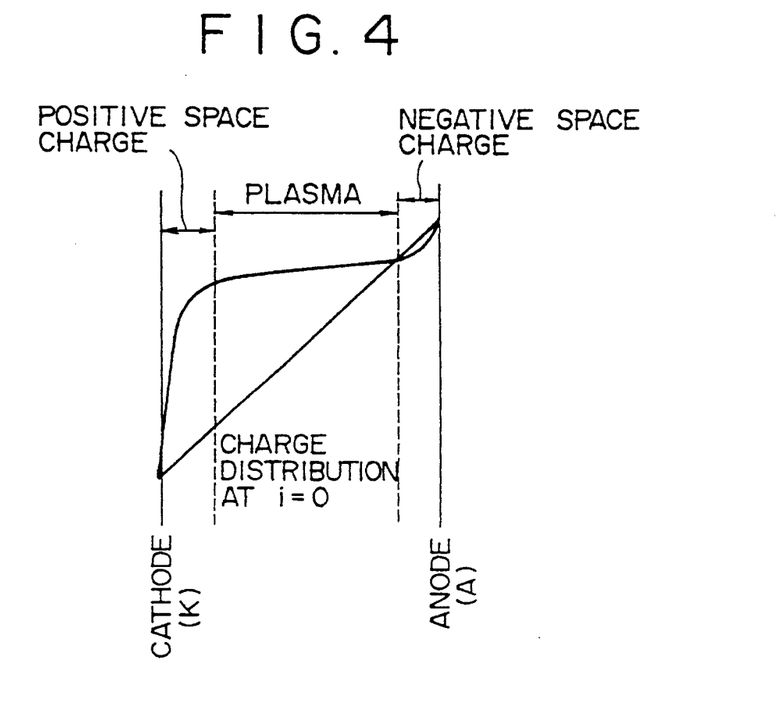
FIG. 4 is a graph showing a potential distribution of a plasma cell formed by parallel flat plates.
Figure 5:
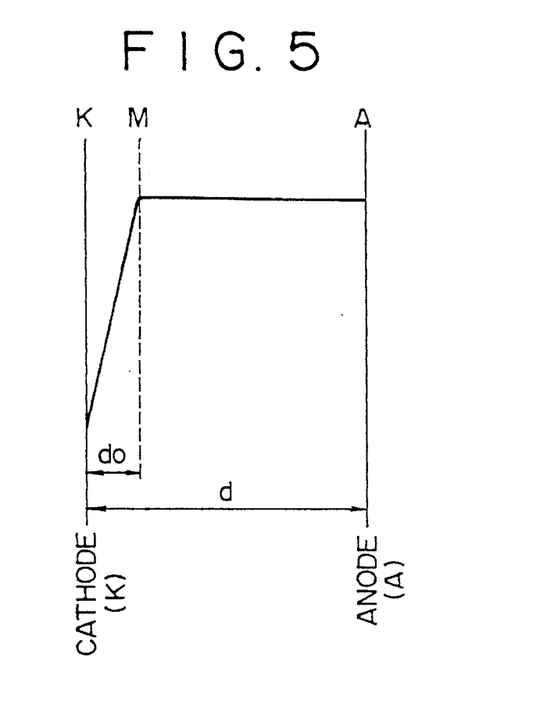
FIG. 5 is a graph showing an approximated representation of a space charge effect in the plasma cell shown in FIG. 4.
Figure 6:
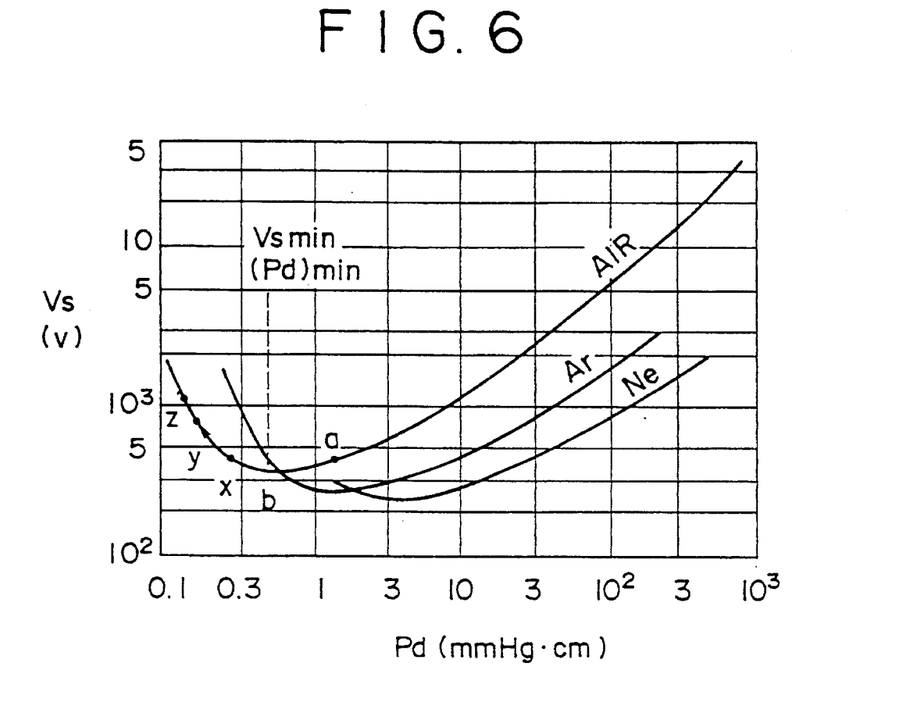
FIG. 6 is a graph showing the relation between a discharge starting voltage $V_S$ and the product of a gas pressure p and an interelectrode distance d.

Now, the discharge path will be theoretically discussed. Prior to the discussion of the discharge path, a mechanism of discharge will first be considered. FIG. 4 shows a mechanism of discharge under the condition of a uniform electric field in generally parallel flat plates. When discharge occurs, a space between an anode (A) and a cathode (K) is filled with a plasma. Electrons are collected on the surface of the anode to show a negative space charge, and conversely, positive ions are collected on the surface of the cathode to show a positive space charge. As a result, a potential distribution in the space between the anode and the cathode is shown by a curve in FIG. 4. The reason why a positive space charge effect is greater than a negative space charge effect is that the positive ion is larger in weight than the electron to show a moving velocity lower than that of the electron and stay longer in the space than the electron. FIG. 5 shows an extremely approximated representation of the potential distribution shown in FIG. 4. In FIG. 5, the plasma is present in a space between M and A, so that this space can be considered as a conductor. Accordingly, it can be considered that the anode A is advanced to the position M. This is equivalent to that the interelectrode distance d has been reduced to $d_0$. According to such a consideration, the generation of a space charge by discharge can provide an effect similar to that to be provided by a reduction in the interelectrode distance.

In the case of the above approximation, the product $pd_0$ of the gas pressure p and the interelectrode distance $d_0$ will be hereinafter referred to as "equivalent pd" for convenience.

Figure 7:
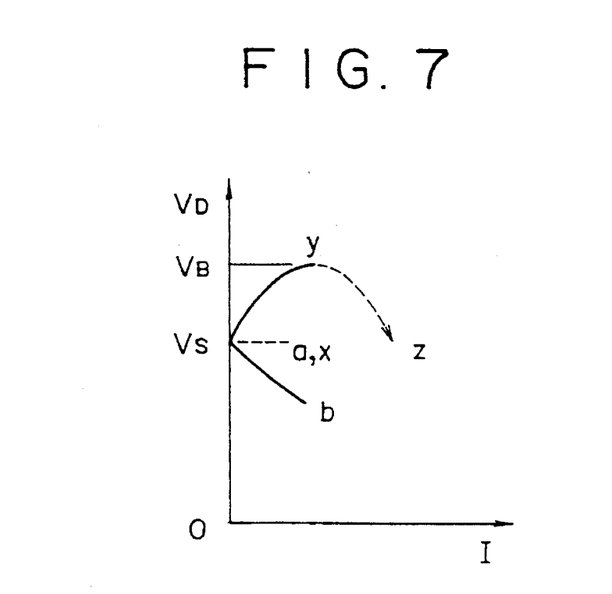
FIG. 7 is a graph showing the relation between a discharge maintaining voltage $V_D$ and a current I.

The Paschen's law (the law of relation between the product pd and a discharge starting voltage $V_S$) will now be examined in consideration of the above. In the case of pd>(Pd)$_{min}$, a voltage $V_D$ for maintaining continuous discharge after starting of discharge decreases from the discharge starting voltage $V_S$ with an increase in discharge current to show a negative resistance characteristic as shown by a solid line $V_S$–b in FIG. 7. Accordingly, when no load resistance is present, a total resistance of a circuit becomes negative. As a result, when V becomes just larger than $V_S$, a large current suddenly flows to bring a breakdown condition. On the other hand, in the case of pd<(pd)min, a positive resistance characteristic as shown by a solid line $V_S$–y in FIG. 7 is shown. Therefore, even when V becomes larger than $V_S$, the discharge is not continued, or a small current limited by a resistance merely flows. However, when V is raised to gradually increase the discharge current, the "equivalent pd" is gradually reduced, and an electric field strength on the surface of the cathode is increased. In particular, a nonuniform electric field appearing at an end portion of the cathode becomes strong. As a result, there occurs a phenomenon which cannot be explained by the theory in the uniform electric field, so that the $V_D$–I characteristic becomes a negative resistance characteristic as shown by a dotted line y–z in FIG. 7, and breakdown occurs as similar to the case of $V_S$–b. A maximum value of $V_D$ appearing in such a course is called a breakdown voltage $V_B$. As will be understood from the above description, $V_B > V_S$ is shown in the case of pd<(pd)$_{min}$, and $V_S = V_B$ is shown in the case of pd>(pd)$_{min}$. The phenomenon of the breakdown is apparently visible. Accordingly, in the case where pd is large, the measurement of $V_S$ can be clearly observed, but in the case of pd<(pd)$_{min}$, a minute current merely flows even upon the reach of $V_S$, so that much care must be taken for the measurement of $V_S$.

Next, the discharge voltage—current characteristic (V–I characteristic) will be examined. As a degree of distortion of the electric field is dominated by a space charge density, the form of the potential distribution as shown in FIG. 4 is decided by a current density i rather than a total current I. Accordingly, when the current density i becomes large at a certain portion of the cathode surface because of any reason, the product pd at this portion is reduced to the "equivalent pd". That is, when there is created a region where the current density i becomes larger because of electric field concentration or the like, the discharge maintaining voltage $V_D$ in this region is reduced. As a result, the current density i in this region is further increased to cause further remarkable concentration of the current. The reduction of $V_D$ terminates at the time when the current density i reaches a value (in) which makes the "equivalent pd" equal to (pd)$_{min}$, and simultaneously the phenomenon of the current concentration is also ended. Letting $S_O$ and S denote a total surface area of the cathode and an area of a portion of the cathode surface where the discharge occurs in the condition of i=in, respectively, the total current I becomes equal to the product of S and in, and almost no discharge occurs at the remaining portion having an area of($S_O$–S) in the condition of i=0. In such a condition, it is considered that $V_D$ is approximate to $V_{smin}$. The total current I is defined by a load resistance.

Figure 8:
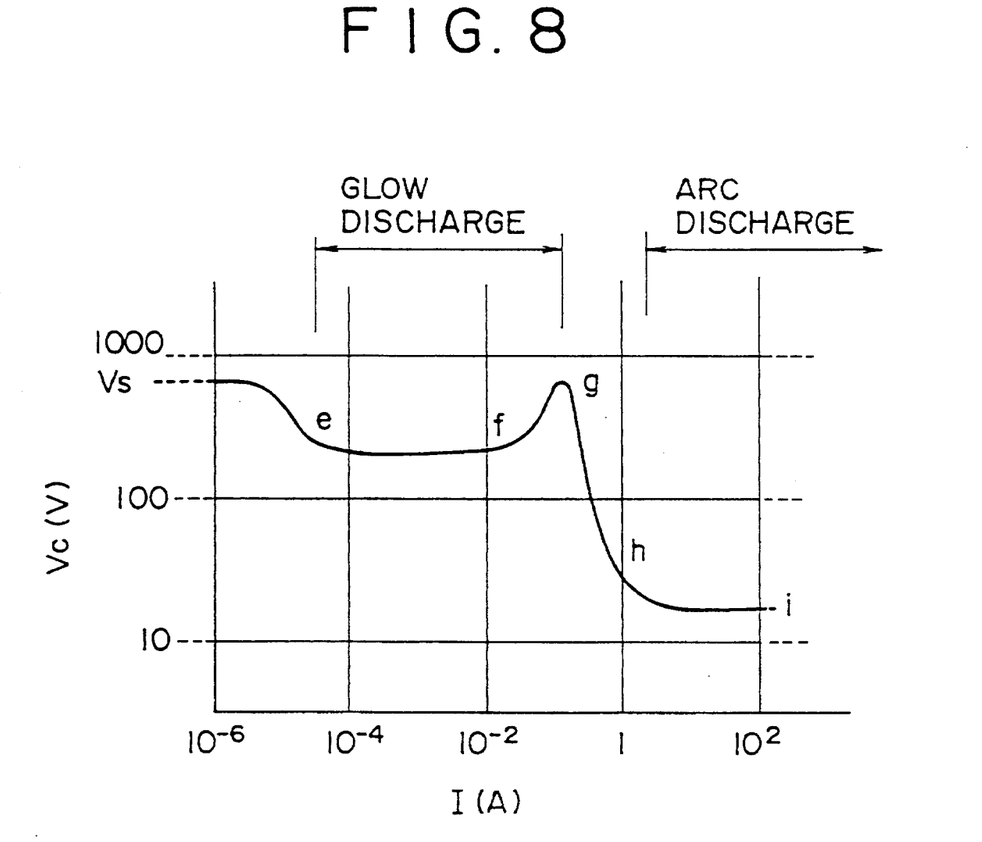
FIG. 8 is a graph showing a typical $V_D$–I characteristic of sustained discharge under low gas pressure.

In the case of increasing the total current I, the increase in I is met by an increase in S, and the value of (in) does not change. Accordingly, $V_D$ does not also change. Such a condition is continued until S becomes equal to $S_O$, that is, the discharge occurs on the total surface of the cathode. For this reason, a constant voltage characteristic (wherein $V_D$ does not change regardless of a change in I) appears in a section between e and f shown in FIG. 8. The discharge occurring in this section is called a normal glow discharge. When the total current is further increased, the "equivalent pd" starts to decrease again and becomes lower than (pd)$_{min}$, so that $V_D$ starts to increase. This phenomenon appears in a section between f and g shown in FIG. 8, which is quite similar to the phenomenon shown by the solid line $V_S$–y in FIG. 7. The discharge occurring in the section between f and g is called an abnormal glow discharge. As similar to the point y in FIG. 7, the phenomenon is largely changed at the point g to start a rapid drop of $V_D$. The reason why the voltage $V_D$ rapidly decreases in a section between g and h shown in FIG. 8 is considered as that a mechanism for maintaining the continuous discharge is basically changed in this section between g and h. It is apparent that this change is mainly due to a remarkable concentration of the electric field. When the total current I is further increased, the continuous discharge by the mechanism changed above occurs in a section between h and j shown in FIG. 8. The voltage $V_D$ in this section between h and j is lower by one or more figures than that in the glow discharge. The discharge in the section between h and j is called an arc discharge. The above description with reference to FIGS. 4 to 8 is shown in the literature "Gas Discharge" (written by Hatta; published by Kindai Kagaku-sha), for example.

Figure 9:
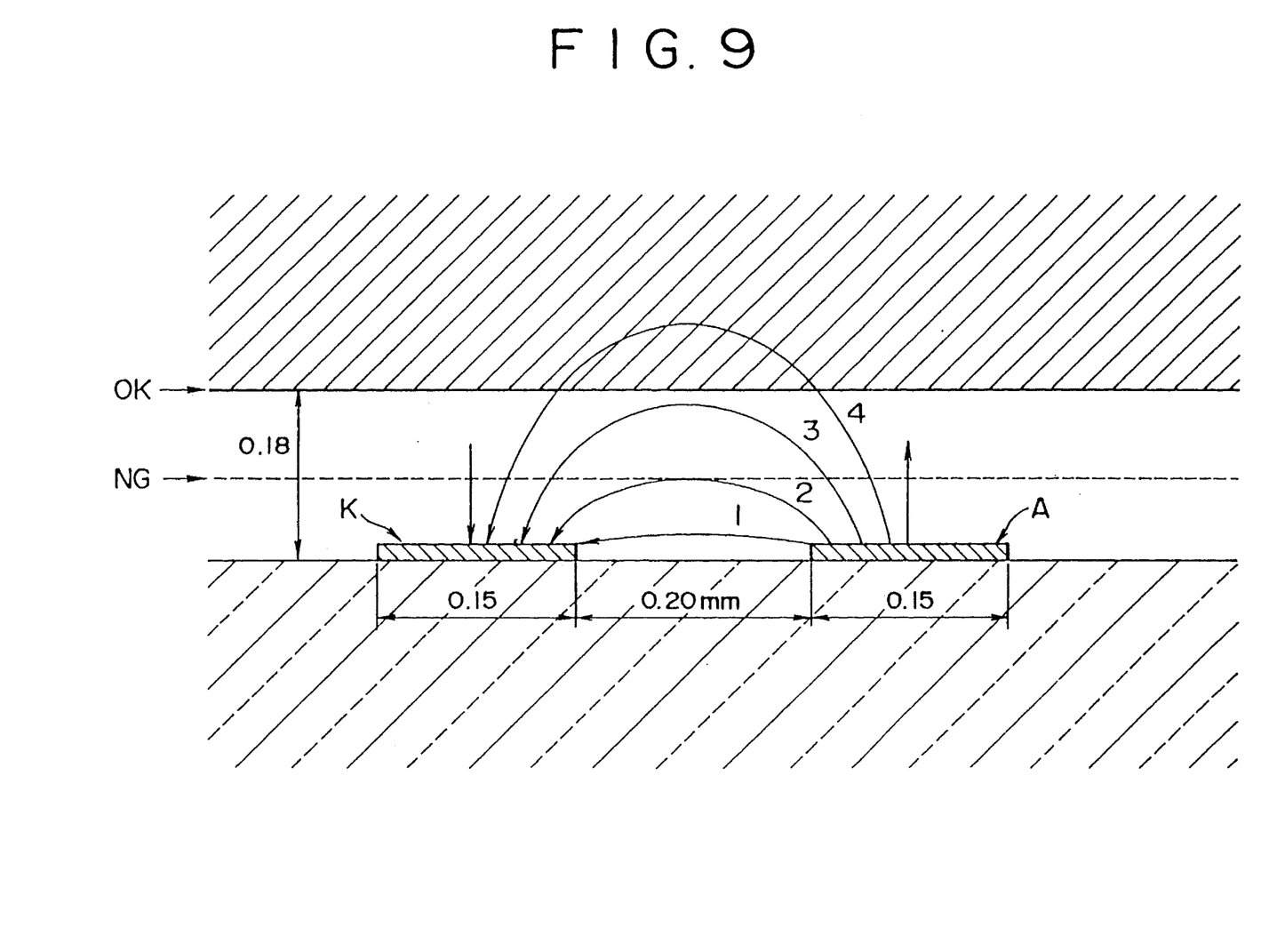
FIG. 9 is a schematic sectional view illustrating various discharge paths in a surface discharge type plasma cell.

Now, the reason why the height of the plasma chamber in the structure as shown in FIG. 1 must be set to a predetermined value or more will be examined with reference to FIG. 9. The lines of electric force in the plasma chamber do not intersect each other, and show parabolic forms. However, an electric field is nonuniform, and in principle, it is intensively collected particularly at the electrode end. In addition, the electrode end is remarkably nonuniform in shape. As a result, the lines of electric force are apt to be collected at one point of the electrode end to cause an appearance of a remarkable nonuniform electric field region. As mentioned above, a uniform electric field is necessary to maintain the uniform normal glow discharge. That is, the maintenance of the uniform normal glow discharge is hindered by the remarkably nonuniform electric field. Accordingly, it is estimated that the normal glow discharge is hard to occur at the electrode end. By the way, a discharge path, that is, a path of electrons from the cathode to the anode is considered to extend generally along the lines of electric force in average from a statistic viewpoint although there is a possibility of collision between the electrons and gas atoms in the path to cause deviation of the electrons from the path. Accordingly, in a plasma cell having the dimension shown in FIG. 9, a distance d of the discharge path is given in the range of about 0.24–0.6 mm. The distance d corresponds to the interelectrode distance in the Paschen's law. Accordingly, in the plasma cell shown in FIG. 9, a ratio of (pd)$_{max}$ and (pd)$_{min}$ becomes two times or more.

The discharge occurring in such a plasma cell as shown in FIG. 9 may be considered in the following cases. Referring to FIG. 9, reference numerals 1 to 4 denote discharge path Nos., and in the following description, (pd)$_{1-4}$ correspond to the discharge path Nos. 1 to 4, respectively.

Figure 10:
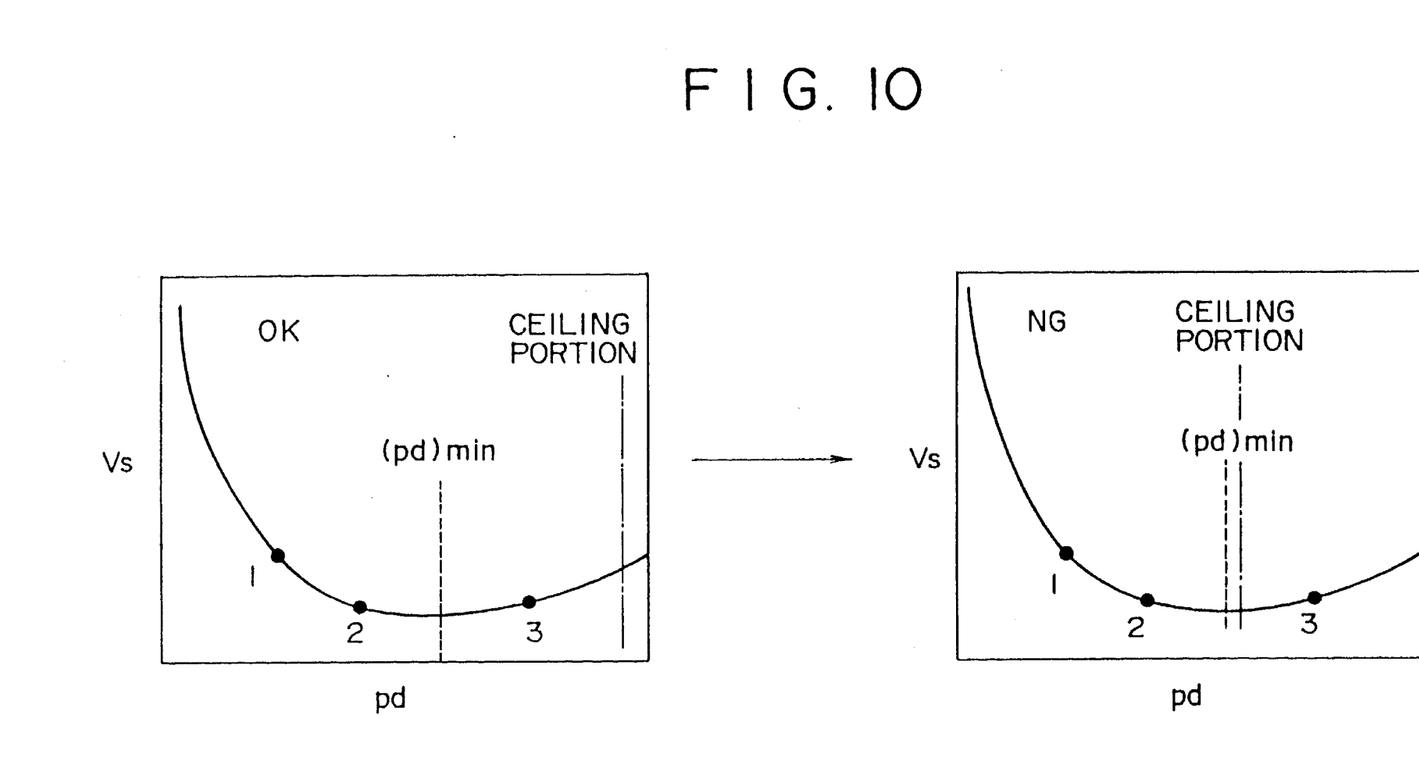
FIGS. 10, 11 and 12 are graphs showing the relation between pd and $V_S$ in different cases.

(1) (pd)$_{1,2}$<(pd)$_{min}$<(pd)$_3$ (see FIG. 10)

In this case, when an applied voltage exceeds $V_S$, the discharge hardly occurs in the discharge path Nos. 1 and 2, but the normal glow discharge occurs in the discharge path No. 3. Accordingly, a uniform and stable discharge is obtained as a whole. However, if the ceiling portion is lowered to the level shown by a broken line in FIG. 9, the discharge path No. 3 is physically blocked by the ceiling portion to stop the discharge. Further, even if the applied voltage is increased, no continuous discharge occurs in the discharge path Nos. 1 and 2, but breakdown occurs or local discharge with a high current density like the arc discharge merely occurs. Thus, uniform discharge cannot be obtained.

Figure 11:
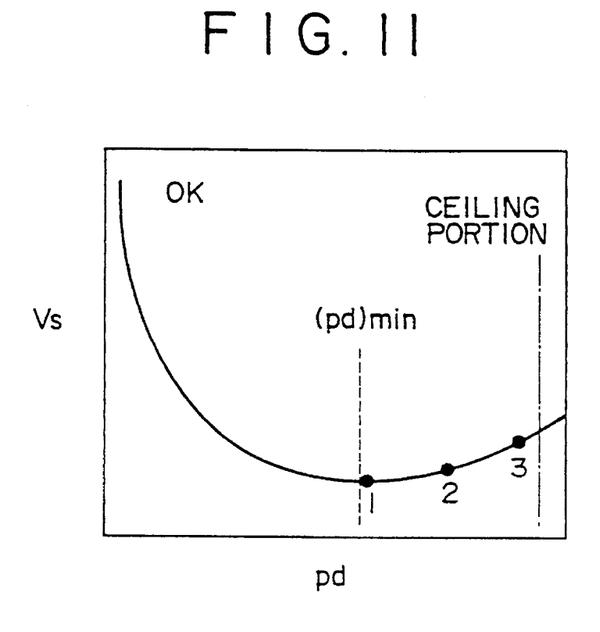

(2) $(pd)_{min} < (Pd)_{1,2} < (pd)_3$ (see FIG. 11)

In this case, the normal glow discharge occurs in the discharge path No. 3. In the discharge path Nos. 1 and 2, a current density becomes locally high because of a remarkably nonuniform electric field, and so breakdown or discharge like the arc discharge is apt to occur in this local region. In the other region, the voltage drops to stop the discharge. As a result, discontinuous discharge locally occurs, and uniform and continuous discharge cannot be obtained as a whole.

Figure 12:
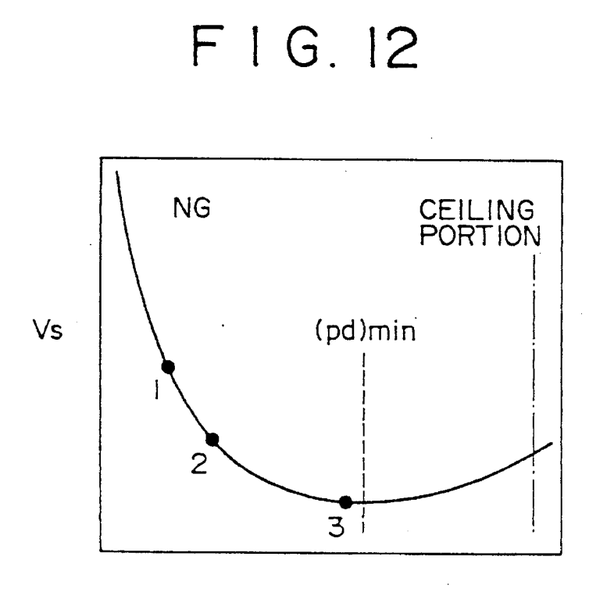

(3) $(pd)_{1,2} < (pd)_3 < (pd)_{min}$ (see FIG. 12)

In this case, the normal glow discharge does not occur.

In summary, in order to maintain uniform and stable glow discharge, it is necessary to make the discharge occur inside the electrode to some degree and prevent breakdown at the electrode end. The test result shown in FIG. 3 demonstrates that the height corresponding to the normal discharge path is about 75% of the interelectrode distance based on the electrode end in the structure shown in FIG. 1. As the discharge path and the dimension are in similar relationship to each other, the ratio of 75% is invariable regardless of a change in the interelectrode distance. The above consideration is in good agreement with the phenomenon observed in the test, that is, no contradiction arises. Thus, the reason why the predetermined height is required is considered to depend upon the discharge path with a high possibility.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A plasma addressed electro-optical device, comprising:
   a first substrate having a plurality of first electrodes on a major surface of said first substrate;
   a dielectric material sheet spaced from said first substrate;
   an electro-optical material layer sandwiched between said first substrate and said dielectric material sheet;
   a second substrate having a plurality of second electrodes formed on a major planar surface of said second substrate, said second electrodes extending in substantially parallel relationship to each other, said second substrate and said dielectric material sheet being disposed face-to-face to form a plasma discharge chamber therebetween;
   an ionizable gas within said plasma discharge chamber which forms a plasma discharge between adjacent ones of said second electrodes, said plasma discharge chamber having a height of at least about 75% of a distance between said adjacent ones of said second electrodes on said planar major surface to address display elements of the electro-optical device.

2. A plasma addressed electro-optical device according to claim 1, wherein said major surface of said second substrate comprises an upper flat surface, and said second electrodes formed on said upper flat surface have upper surfaces of the same level.

3. A plasma addressed electro-optical device according to claim 1, further comprising a plurality of barrier ribs for supporting said dielectric material layer.

4. A plasma addressed electro-optical device according to claim 3, wherein said barrier ribs are formed on said major surface of said second substrate so as to surround said adjacent ones of said second electrodes.

5. A plasma discharge chamber, comprising:
   a substrate having a major planar surface;
   a plurality of electrodes formed on said major planar surface of said substrate so as to extend in substantially parallel relationship to each other;
   a dielectric material layer formed in opposed relationship to said major planar surface of said substrate so as to define a plasma discharge chamber having a height of at least about 75% of a distance between said adjacent ones of said electrodes; and
   an ionizable gas in said discharge chamber which forms a plasma discharge between adjacent ones of said second electrodes when said adjacent ones are driven by a drive voltage to address display elements.

6. A plasma discharge chamber, according to claim 5, wherein said major surface of said substrate comprises an upper flat surface, and said electrodes formed on said upper flat surface have upper surfaces of the same level.

7. A plasma discharge chamber according to claim 5, further comprising a plurality of barrier ribs for supporting said dielectric material layer.

8. A plasma discharge chamber according to claim 7, wherein said barrier ribs are formed on said major surface of said substrate so as to surround said adjacent ones of said second electrodes.

* * * * *